(12) United States Patent
Glazko et al.

(10) Patent No.: US 8,576,931 B2
(45) Date of Patent: Nov. 5, 2013

(54) METHODS AND SYSTEMS FOR OVERHEAD REDUCTION IN A WIRELESS COMMUNICATION NETWORK

(75) Inventors: Serguei A. Glazko, San Diego, CA (US); Matthias Brehler, Boulder, CO (US); Je Woo Kim, Cupertino, CA (US); Mahesh Makhijani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 612 days.

(21) Appl. No.: 12/486,744

(22) Filed: Jun. 17, 2009

(65) Prior Publication Data

US 2009/0316815 A1 Dec. 24, 2009

Related U.S. Application Data

(60) Provisional application No. 61/075,315, filed on Jun. 24, 2008.

(51) Int. Cl.
*H04L 27/28* (2006.01)

(52) U.S. Cl.
USPC ........... 375/260; 375/267; 375/299; 455/101; 455/132; 455/450; 455/50; 455/562.1; 370/329; 370/330; 370/332; 370/334; 370/335; 370/341; 370/343; 370/344

(58) Field of Classification Search
USPC .......... 375/260, 267, 299; 455/101, 132, 450, 455/500, 562.1; 370/329, 330, 332, 334, 370/335, 341, 343, 344
See application file for complete search history.

(56) References Cited

U.S. PATENT DOCUMENTS

| | | | |
|---|---|---|---|
| 2005/0120097 A1 | 6/2005 | Walton et al. | |
| 2008/0004029 A1* | 1/2008 | Moilanen | 455/450 |
| 2008/0072115 A1 | 3/2008 | Cho et al. | |
| 2008/0101275 A1 | 5/2008 | Kang et al. | |
| 2009/0232084 A1* | 9/2009 | Li et al. | 370/330 |
| 2009/0274204 A1* | 11/2009 | Chen et al. | 375/228 |

FOREIGN PATENT DOCUMENTS

| | | |
|---|---|---|
| CN | 1930799 A | 3/2007 |
| CN | 1930804 A | 3/2007 |
| CN | 101147343 A | 3/2008 |

(Continued)

OTHER PUBLICATIONS

IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corri.

(Continued)

*Primary Examiner* — Leon Flores
(74) *Attorney, Agent, or Firm* — Tyler J. Overall

(57) ABSTRACT

Methods and apparatus are provided for increasing throughput in a wireless communication system by reducing the amount of overhead transmitted to certain user terminals. Overhead due to control information may be reduced for these certain user terminals by selecting a low repetition factor. Overhead may be further reduced for these certain user terminals by selecting a modulation/coding scheme with a higher data rate for transmitting the control information. The selection may be based on channel conditions associated with the user terminals, such as signal-to-interference-plus-noise ratios (SINRs).

28 Claims, 9 Drawing Sheets

(56) References Cited

FOREIGN PATENT DOCUMENTS

| | | |
|---|---|---|
| EP | 1811730 A1 | 7/2007 |
| WO | WO2007045101 | 4/2007 |
| WO | 2007105977 A1 | 9/2007 |
| WO | WO2008000915 | 1/2008 |
| WO | WO2008041819 A2 | 4/2008 |

OTHER PUBLICATIONS

International Search Report and Written Opinion—PCT/US2009/048293, International Search Authority—European Patent Office—Sep. 3, 2010.

Taiwan Search Report13 TW098121228—TIPO—Jul. 3, 2012.

* cited by examiner

| FCH(DLFP)_Message_Format | |
|---|---|
| Used SCH bitmap:<br>A bitmap indicating which groups of SCH are used on the 1st PUSC zone and on PUSC zones in which 'use all SC' indicator is set to '0' in STC_DL_Zone_IE0. Value 1 means used by this segment and 0 means not used.<br>　　　　　　　　　2048　　　1024　　　512　　　128<br>bit 0: SCH Group 0　　0~11(12)　0~ 5(6)　0~4(5)　　0(1)<br>bit 1: SCH Group 1　12~19( 8)　6~ 9(4)　NA　　　NA<br>bit 2: SCH Group 2　20~31(12)　10~15(6)　5~9(5)　　1(1)<br>bit 3: SCH Group 3　32~39( 8)　16~19(4)　NA　　　NA<br>bit 4: SCH Group 4　40~51(12)　20~25(6)　10~14(5)　2(1)<br>bit 5: SCH Group 5　52~59( 8)　26~29(4)　NA　　　NA | 6 bits |
| Reserved: set to 0 | 1 bit |
| Repetition Coding Indication: on DL Map<br>No additional Rep=total1(0), 1 additional Rep=total2(1),<br>3 additional Rep=total4(2), 5 additional Rep=total6(3) | 2 bits |
| Coding Indication: on DL Map<br>DL Map shall be transmitted with QPSK at FEC rate 1/2<br>The BS ensures that DL Map (and other MAC msg required for SS operation) are sent with the mandatory coding scheme often enough to ensure uninterrupted operation of SS supporting only the mandatory coding scheme.<br><br>CC(0), BTC(1), CTC(2), ZTCC(3), CC w oINT(4), LDPC(5) | 3 bits |
| DL Map Length:<br>Defines the length in slots of the DL Map msg that follows immediately the DLFP, after repetition code is applied. | 8 bits |
| Reserved: set to 0 | 4 bits |

METHODS AND SYSTEMS FOR OVERHEAD REDUCTION IN A WIRELESS COMMUNICATION NETWORK

CLAIM OF PRIORITY

This application claims benefit of priority from U.S. Provisional Patent Application Ser. No. 61/075,315, entitled "Methods and Systems for Overhead Reduction in a Wireless Communication Network" and filed Jun. 24, 2008, which is assigned to the assignee of this application and is fully incorporated herein by reference for all purposes.

TECHNICAL FIELD

Certain embodiments of the present disclosure generally relate to wireless communication and, more particularly, to overhead reduction in a wireless communication network.

SUMMARY

Certain embodiments of the present disclosure generally relate to reducing the overall overhead in a wireless communication network.

Certain embodiments of the present disclosure provide a method for wireless communications. The method generally includes determining channel conditions of one or more user terminals; scheduling information for a first portion of the user terminals with less desirable channel conditions in a first frame with a higher downlink MAP (DL-MAP) repetition; scheduling information for a second portion of the user terminals with more desirable channel conditions in a second frame with a lower DL-MAP repetition; and transmitting the first and second frames.

Certain embodiments of the present disclosure provide an apparatus for wireless communications. The apparatus generally includes means for determining channel conditions of one or more user terminals; means for scheduling information for a first portion of the user terminals with less desirable channel conditions in a first frame with a higher DL-MAP repetition; means for scheduling information for a second portion of the user terminals with more desirable channel conditions in a second frame with a lower DL-MAP repetition; and means for transmitting the first and second frames.

Certain embodiments of the present disclosure provide an apparatus for wireless communications. The apparatus generally includes logic for determining channel conditions of one or more user terminals; means for scheduling information for a first portion of the user terminals with less desirable channel conditions in a first frame with a higher DL-MAP repetition; logic for scheduling information for a second portion of the user terminals with more desirable channel conditions in a second frame with a lower DL-MAP repetition; and a transmitter for transmitting the first and second frames.

Certain embodiments of the present disclosure provide a computer-program product for wireless communications. The computer-program product typically includes a computer-readable medium having instructions stored thereon, the instructions being executable by one or more processors. The instructions generally include instructions for determining channel conditions of one or more user terminals; instructions for scheduling information for a first portion of the user terminals with less desirable channel conditions in a first frame with a higher DL-MAP repetition; instructions for scheduling information for a second portion of the user terminals with more desirable channel conditions in a second frame with a lower DL-MAP repetition; and instructions for transmitting the first and second frames.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 4A and 4B illustrate an example OFDM/OFDMA frame for Time Division Duplex (TDD) and the format of the Frame Control Header (FCH) contained therein, the FCH including downlink Frame Prefix (DLFP) information, in accordance with certain embodiments of the present disclosure.

DETAILED DESCRIPTION

Figure 1:
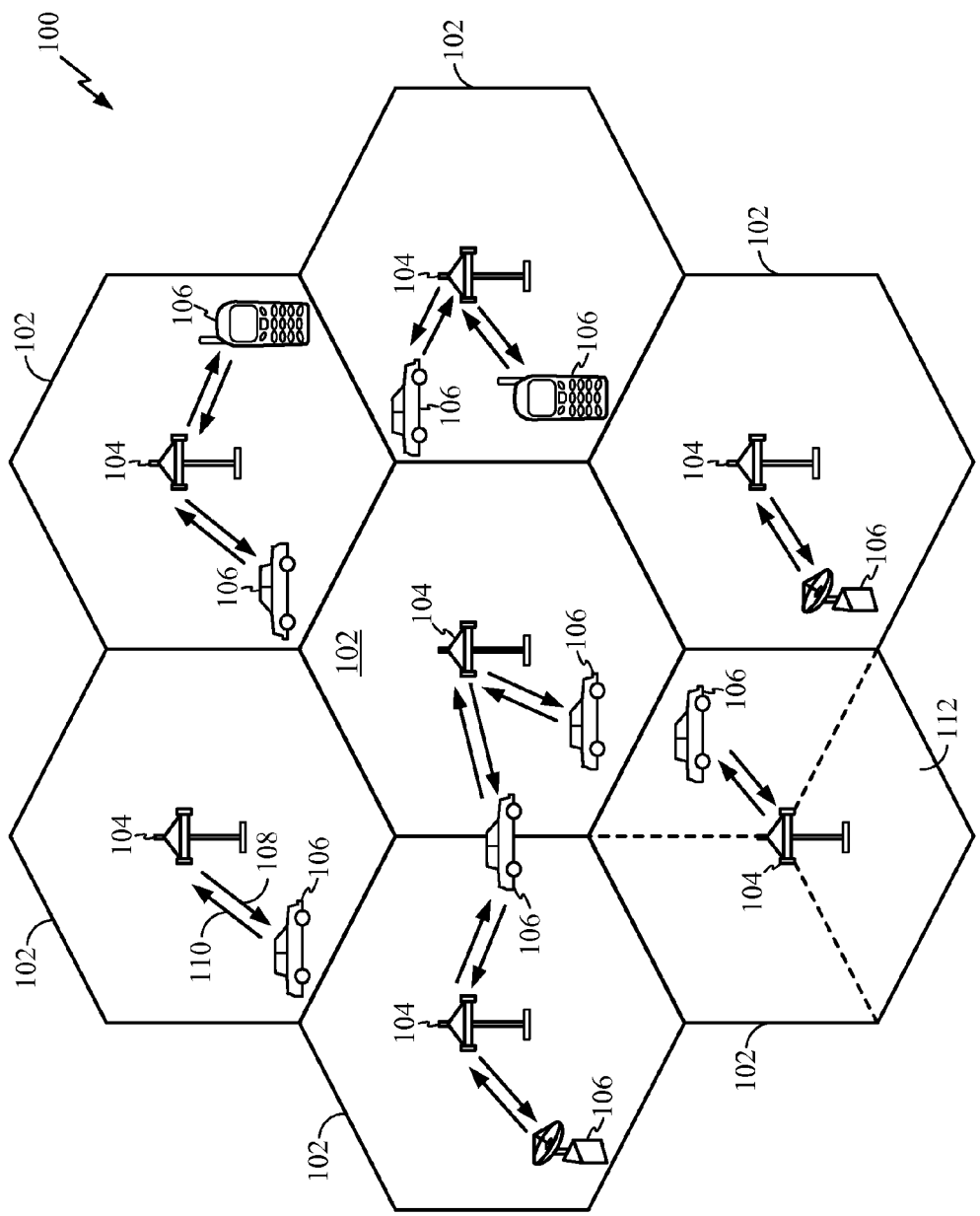
FIG. 1 illustrates an example wireless communication system, in accordance with certain embodiments of the present disclosure.

Certain embodiments of the present disclosure provide techniques that may increase throughput in a wireless communication system by reducing the amount of overhead transmitted to certain user terminals. Overhead due to control information may be reduced for these certain user terminals by selecting a low repetition factor. Overhead may be further reduced for these certain user terminals by selecting a modulation/coding scheme with a higher data rate for transmitting the control information. The selection may be based on channel conditions associated with the user terminals, such as signal-to-interference-plus-noise ratios (SINRs).

Orthogonal frequency-division multiplexing (OFDM) and orthogonal frequency division multiple access (OFDMA) wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations.

Under the current versions of the IEEE 802.16x standards for the OFDM and OFDMA systems, every downlink subframe from a base station includes a preamble, a frame control header (FCH) following the preamble, and a downlink map (DL-MAP) following the FCH as part of the overhead load. The preamble includes information for searching a cell and a cell sector within a cell and for synchronizing a mobile station in both time and frequency with the received downlink signal. The FCH portion of the downlink subframe includes 24 bits with information on the downlink transmission format (e.g., the DL-MAP) and control information for the downlink data reception (e.g., allocation of the subcarriers in the current downlink frame). The DL-MAP specifies downlink data region allocation and burst profile information so that the DL data bursts in the OFDM/OFDMA frame may be correctly decoded. The first DL data burst is typically an uplink map (UL-MAP) containing similar allocation and burst profile information for uplink transmissions on a per-frame basis, which may also be considered as part of the control overhead.

The control overhead consumes both time and frequency resources in an OFDM or OFDMA frame, and the control messages grow with the number of concurrent users (e.g., mobile stations) supported by a base station. Because these time and frequency resources are limited on a per-frame basis, greater consumption of these resources by the control overhead means there are fewer resources for data traffic. Moreover, because most control messages are encoded with the lowest coding rate so that these messages may be reliably received by as many mobile stations as possible, a small increase in the size of the control messages leads to a considerably larger increase in the consumption of the frame resources. As a result of increasing control overhead, maximum data throughput of a mobile station will decrease exponentially as the number of concurrent users increases.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16 is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
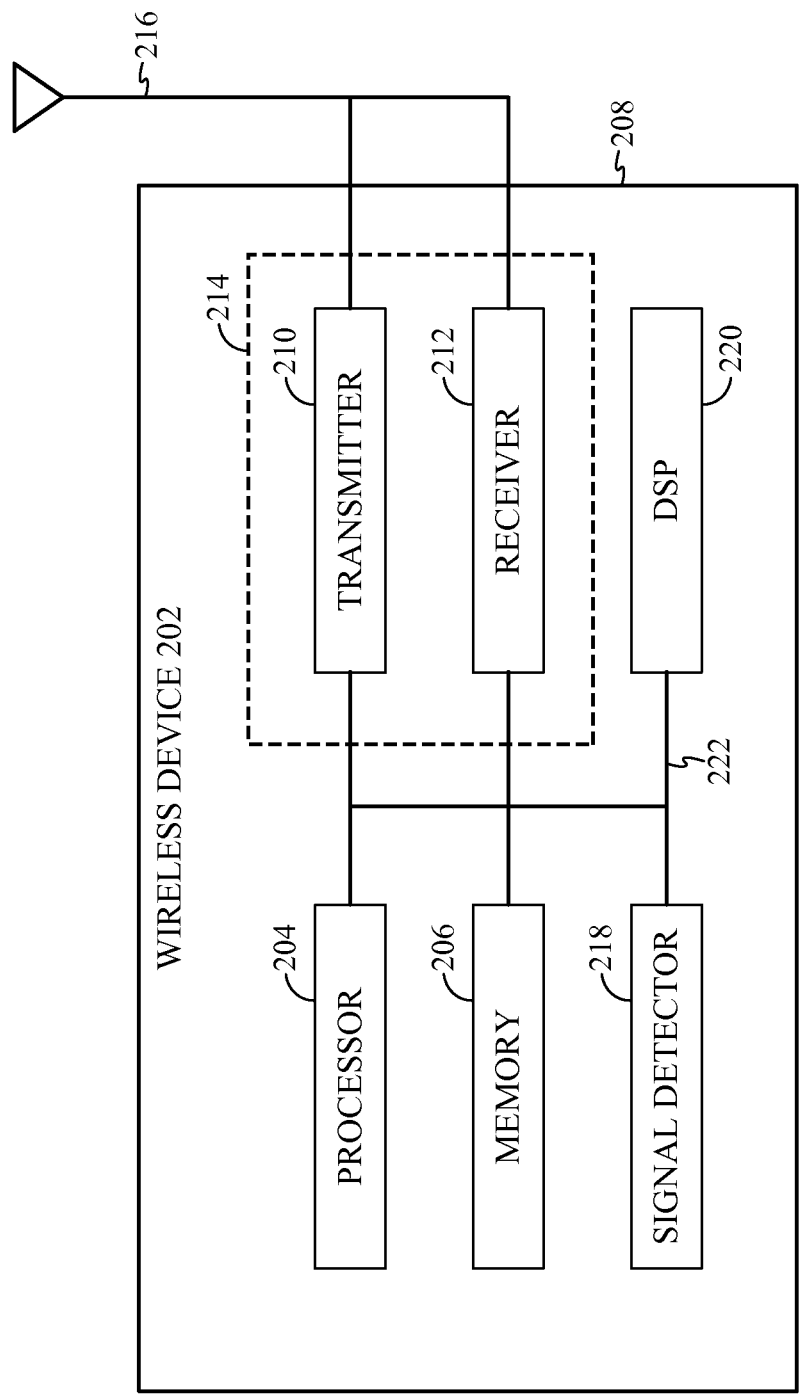
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
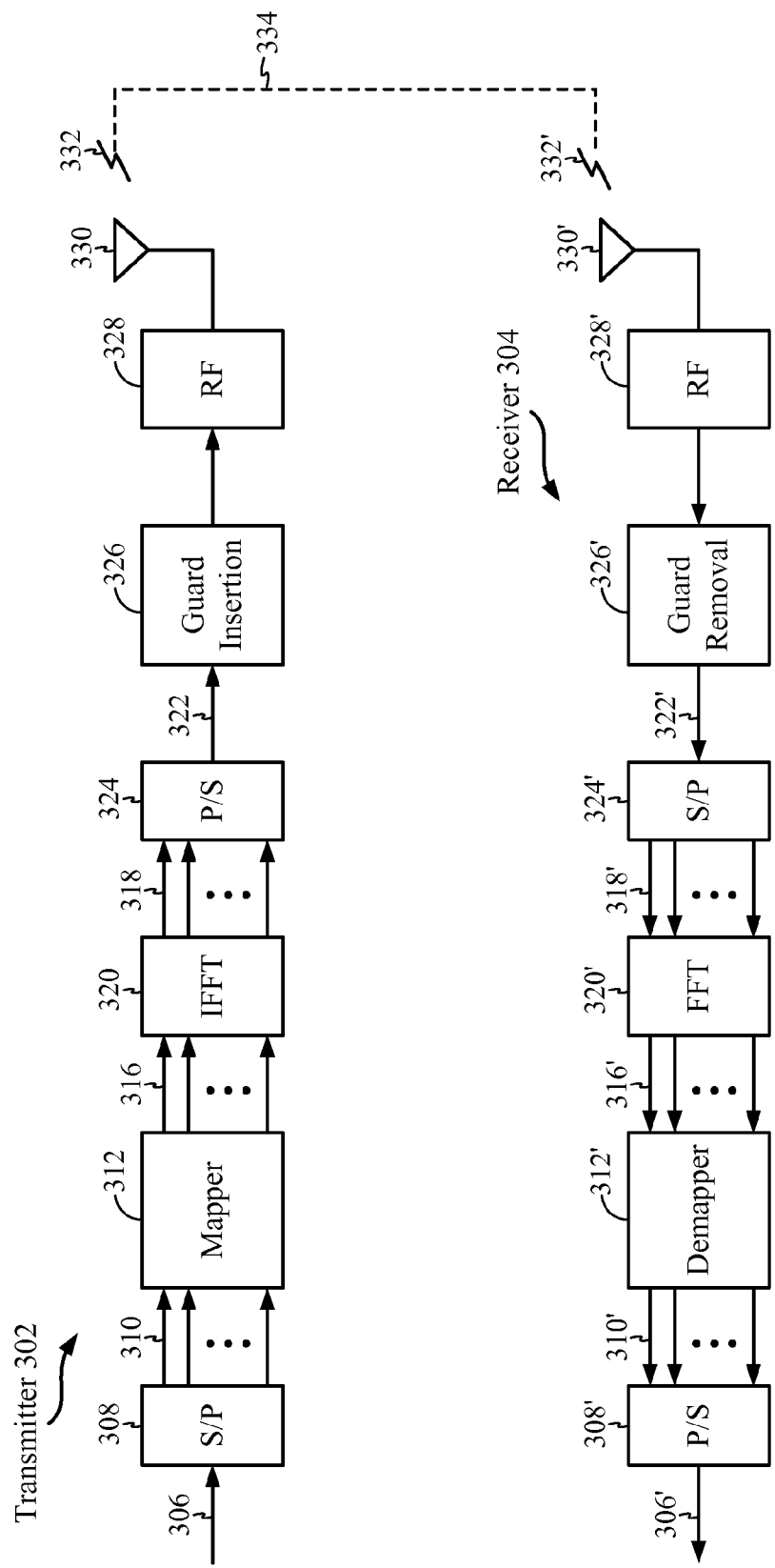
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor.

Exemplary OFDM/OFDMA Frame

Figure 4A:
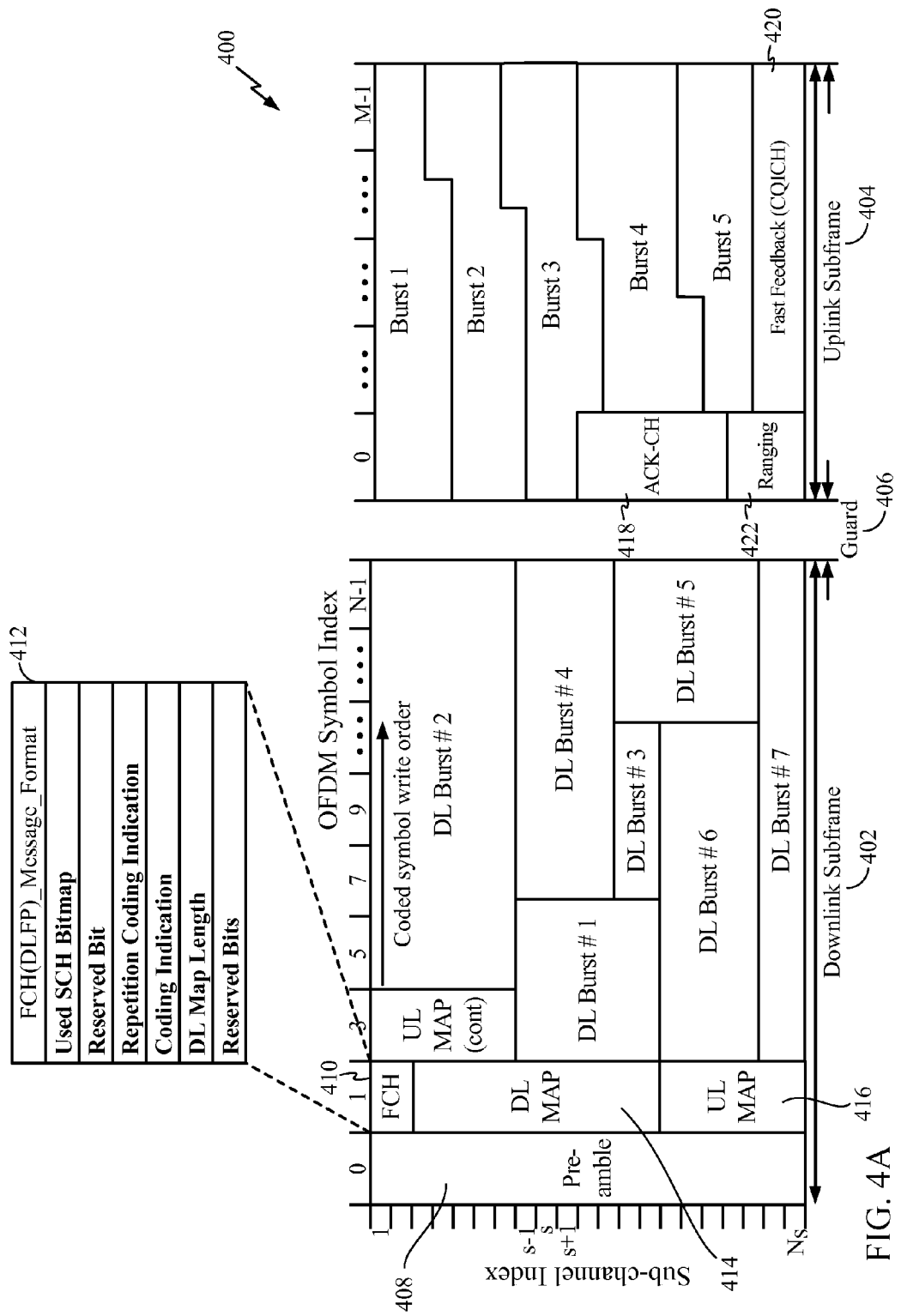

Referring now to FIG. 4A, an OFDM/OFDMA frame 400 for a Time Division Duplex (TDD) implementation is depicted as a typical, but not limiting, example. Other implementations of an OFDM/OFDMA frame, such as Full and Half-Duplex Frequency Division Duplex (FDD) may be used, in which case the frame is the same except that both downlink (DL) and uplink (UL) messages are transmitted simultaneously over different carriers. In the TDD implementation, each frame may be divided into a DL subframe 402 and a UL subframe 404, which may be separated by a small guard interval 406—or, more specifically, by Transmit/Receive and Receive/Transmit Transition Gaps (TTG and RTG, respectively)—in an effort to prevent DL and UL transmission collisions. The DL-to-UL-subframe ratio may be varied from 3:1 to 1:1 to support different traffic profiles.

Within the OFDM/OFDMA frame 400, various control information may be included. For example, the first OFDM/OFDMA symbol of the frame 400 may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments of the zone are used. For example, carriers 0, 3, 6, . . . may indicate that segment 0 is to be used, carriers 1, 4, 7, . . . may indicate that segment 1 is to be used, and carriers 2, 5, 8, . . . may indicate that segment 2 is to be used.

A Frame Control Header (FCH) 410 may follow the preamble 408. The FCH 410 may provide frame configuration information, such as the usable subchannels, the modulation and coding scheme, and the MAP message length for the current OFDM/OFDMA frame. A data structure, such as the downlink Frame Prefix (DLFP) 412, outlining the frame configuration information may be mapped to the FCH 410.

As illustrated in FIG. 4B, the DLFP 412 for Mobile WiMAX may comprise six bits for the used subchannel (SCH) bitmap 412a, a reserved bit 412b set to 0, two bits for the repetition coding indication 412c, three bits for the coding indication 412d, eight bits for the MAP message length 412e, and four reserved bits 412f set to 0 for a total of 24 bits in the DLFP 412. Before being mapped to the FCH 410, the 24-bit DLFP may be duplicated to form a 48-bit block, which is the minimal forward error correction (FEC) block size.

Following the FCH 410, a DL-MAP 414 and a UL-MAP 416 may specify data burst allocation and other control information for the DL and UL subframes 402, 404. In the case of OFDMA, multiple users may be allocated data regions within the frame, and these allocations may be specified in the DL and UL-MAP messages 414, 416. The MAP messages may include the burst profile for each user, which defines the modulation and coding scheme used in a particular link. Since MAP messages contain critical information that needs to reach all users, the DL and UL-MAP messages 414, 416 may often be sent over a very reliable link, such as BPSK or QPSK with rate ½ coding and repetition coding. The DL subframe 402 of the OFDM/OFDMA frame may include DL bursts of various bit lengths containing the downlink data being communicated. Thus, the DL-MAP 414 may describe the location of the bursts contained in the downlink zones and the number of downlink bursts, as well as their offsets and lengths in both the time (i.e., symbol) and the frequency (i.e., subchannel) directions.

Likewise, the UL subframe 404 may include UL bursts of various bit lengths composed of the uplink data being communicated. Therefore, the UL-MAP 416, transmitted as the first burst in the downlink subframe 402, may contain information about the location of the UL burst for different users. The UL subframe 404 may include additional control information as illustrated in FIG. 4A. The UL subframe 404 may include a UL ACK 418 allocated for the mobile station (MS) to feed back a DL hybrid automatic repeat request acknowledge (HARQ ACK) and/or a UL CQICH 420 allocated for the MS to feed back channel state information on the Channel Quality Indicator channel (CQICH). Furthermore, the UL subframe 404 may comprise a UL Ranging subchannel 422. The UL Ranging subchannel 422 may be allocated for the MS to perform closed-loop time, frequency, and power adjustment, as well as bandwidth requests. Altogether, the preamble 408, the FCH 410, the DL-MAP 414, and the UL-MAP 416 may carry information that enables the receiver 304 to correctly demodulate the received signal.

For OFDMA, different "modes" can be used for transmission in DL and UL. An area in the time domain where a certain mode is used is generally referred to as a zone. One type of zone is called DL-PUSC (downlink partial usage of subchannels) and may not use all the subchannels available to it (i.e., a DL-PUSC zone may only use particular groups of subchannels). There may be a total of six subchannel groups, which can be assigned to up to three segments. Thus, a segment can contain one to six subchannel groups (e.g., segment 0 contains the first two subchannel groups, segment 1 contains the next two, and segment 2 contains the last two subchannel groups). Another type of zone is called DL-FUSC (downlink full usage of subchannels). Unlike DL-PUSC, DL-FUSC does not use any segments, but can distribute all bursts over the complete frequency range.

Exemplary Overhead Reduction in a Wireless Communication Network

In a wireless communication system/network, control information transmitted by a BS to user terminals may occupy large portions of the OFDM/OFDMA frames 400 and, hence, large amounts of system bandwidth, which may affect overall system throughput. For example, in a mobile WiMAX system, control information, such as the DL-MAP 414 and UL-MAP 416, may be broadcast in an effort to notify the user terminals 106 of DL data bursts and UL transmission opportunities. The control information may occupy several OFDM/OFDMA slots resulting in high overhead. As an example, in certain systems employing a frequency reuse factor of 3, the control information may occupy up to 60% of an OFDM/OFDMA frame. Furthermore, conventional systems employing a low frequency reuse factor (e.g., 1) have typically needed to use high repetition and modulation/coding schemes with a lower data rate, such as QPSK ½, for the control information in an effort to ensure reliable delivery (e.g., 1% error rate) for all user terminals. The resulting overhead may significantly degrade system throughput.

In an effort to increase throughput in a mobile WiMAX system for certain user terminals, a suitable repetition factor (i.e., number of repetitions)—and, for some embodiments, a suitable modulation/coding scheme—may be selected for control information on a user terminal basis. For example, this selection may be based on different channel conditions associated with the various user terminals.

Figure 5:
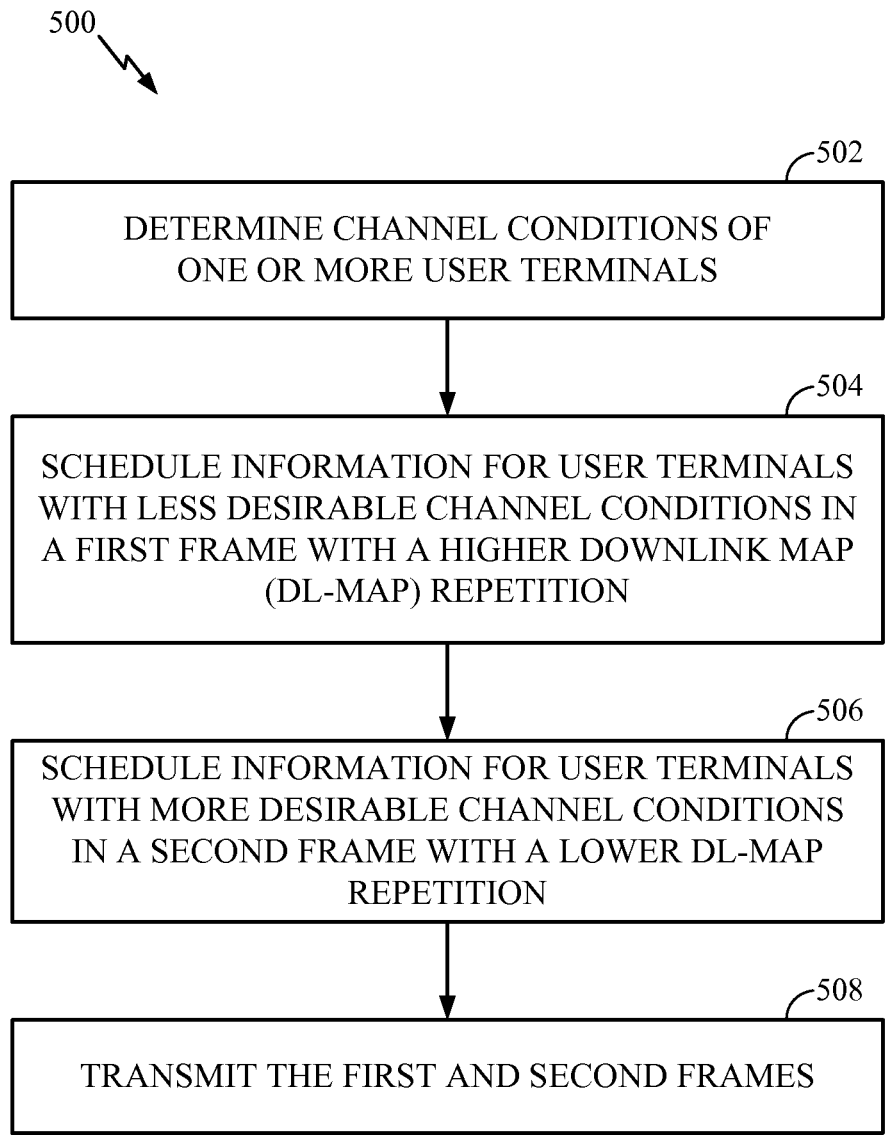
FIG. 5 illustrates example operations for reducing overhead caused by downlink map (DL-MAP) information, in accordance with certain embodiments of the present disclosure.

FIG. 5 illustrates example operations 500 for reducing DL-MAP overhead transmitted to one or more user terminals 106 in a wireless cell's coverage area, in accordance with certain embodiments of the present disclosure. The operations 500 may be performed by a BS 104. These operations 500 may also be utilized for reducing overhead caused by other types of control information (e.g., UL-MAP), as well.

At 502, the BS may determine channel conditions of the various user terminals in the coverage area. The channel conditions of the user terminals may be determined by, for example, measuring the strength of pilot signals received from the user terminals. The BS may thus identify user terminals with less desirable channel conditions (e.g., lower signal strength, higher interference, higher noise, or lower SINR) and group these terminals separately from user terminals with more desirable channel conditions (e.g., higher signal strength, lower interference, lower noise, or higher SINR).

Any of various suitable techniques may be employed for determining whether channel conditions of a particular user terminal are less/more desirable and grouping user terminals accordingly. For example, user terminals with signal strength lower than a threshold value may be identified as having less desirable channel conditions and may be grouped separately from the other user terminals. The grouping may also be performed by ranking each user terminal according to the measured signal strength and then, based on the number of user terminals, grouping a fraction of the user terminals with the highest signal strength separately from the rest of the user terminals. An example of grouping user terminals based on channel conditions is described in greater detail below.

At 504, the BS may schedule information for a portion of the user terminals with less desirable channel conditions in a first frame, such as an OFDM/OFDMA frame 400, with a higher DL-MAP repetition. Employing a higher repetition for the DL-MAP 414 may increase reliability of DL-MAP reception by the user terminals with less desirable channel conditions. For certain embodiments, in addition to, or instead of, employing higher DL-MAP repetition in the OFDM/OFDMA frame, a low-rate modulation/coding scheme (MCS), such as QPSK with a coding rate of ½, may be utilized for modulating and encoding the DL-MAP information. Utilizing lower data rate modulation/coding schemes in addition to higher DL-MAP repetition may further increase the likelihood of the user terminals successfully receiving the DL-MAP. For some embodiments, selection of the repetition factor and/or the MCS may also be based on a target bit/modulation error rate (BER/MER) for the system.

At 506, the BS may schedule information for a portion of the user terminals with more desirable channel conditions in a second frame, such as an OFDM/OFDMA frame 400, with a lower DL-MAP repetition. User terminals with more desirable channel conditions, such as those near the BS more apt to benefit from greater signal strength, are more likely to successfully receive transmitted information. Therefore, a lower DL-MAP repetition or even no repetitions (i.e., transmitting only once without repeating within the frame) may be sufficient for reliable DL-MAP delivery. An advantage of employing lower or no DL-MAP repetition is that overhead due to the DL-MAP may be reduced. The DL-MAP overhead may be reduced further by utilizing an MCS with a higher data rate.

At 508, the BS may transmit the first and second frames. The DL-MAP repetition used in each frame may be specified to the user terminals via the repetition coding indication 412c in the DLFP 412 of the FCH 410.

With these operations 500, control information for all the user terminals communicating with the BS need not be delivered in every frame. By determining channel conditions of the user terminals and selecting the repetition factor and/or MCS accordingly, the BS may transmit frames with a reduced amount of control information to user terminals with more desirable channel conditions, as described above. As a result, average overhead transmitted to the user terminals may decrease despite the higher overhead in frames transmitted to the user terminals with less desirable channel conditions. Therefore, more frame resources may be available for data bursts in the frames with reduced control overhead, which may lead to an increase in system throughput.

Figure 6:
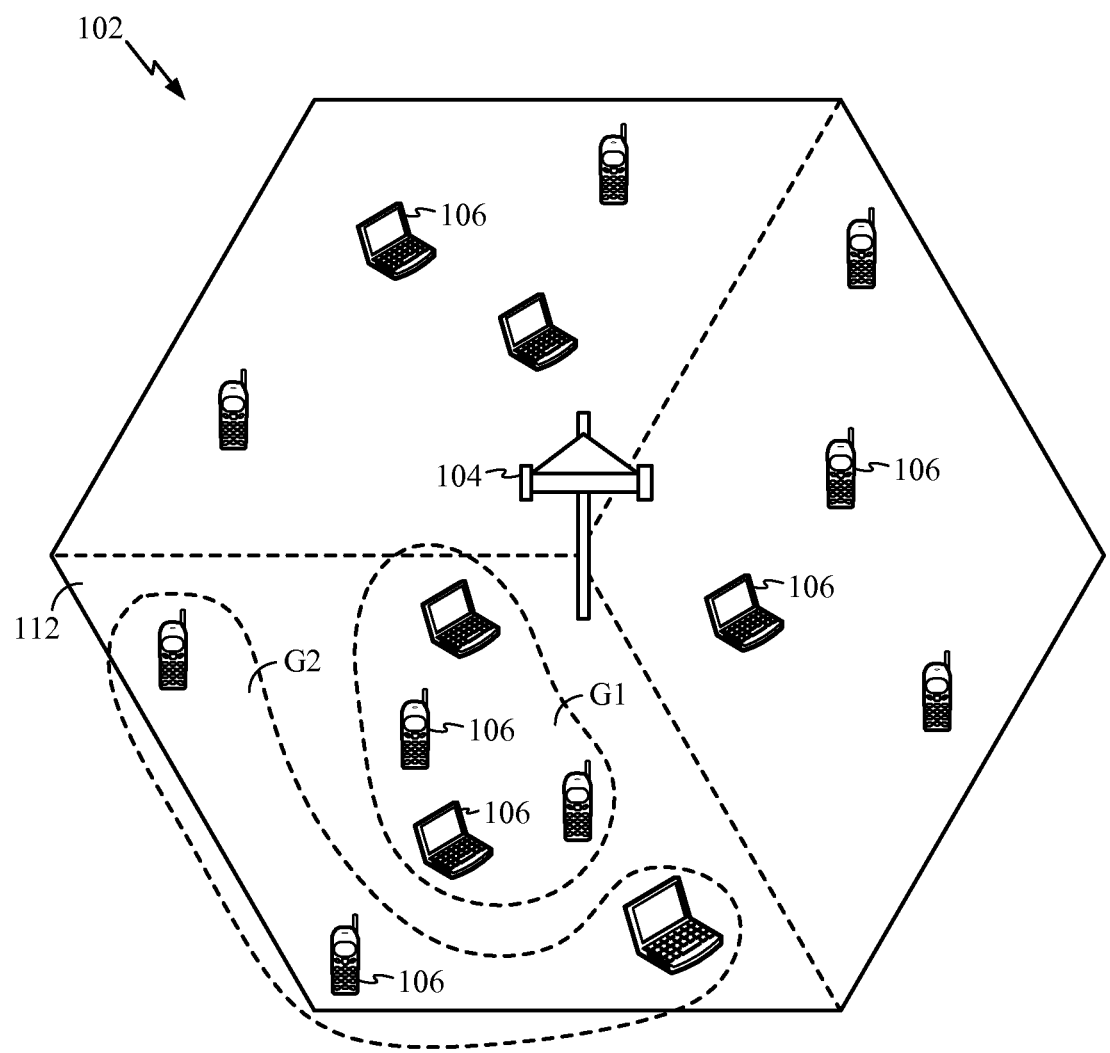
FIG. 6 illustrates an example of grouping user terminals based on channel conditions, in accordance with certain embodiments of the present disclosure.

FIG. 6 illustrates an example of grouping user terminals based on channel conditions. User terminals 106 within a sector 112 or across the entire cell 102 may be grouped according to channel conditions determined by parameters, such as pilot signal strength values, received from the user terminals. As an example, user terminals 106 in a certain sector 112 may be divided into two groups G1 and G2 as illustrated in FIG. 6. Group G1 may include user terminals, such as those near the BS 104, with more desirable channel conditions (e.g., greater signal strength), while group G2 may include user terminals, such as those near the edge of the coverage area, with less desirable channel conditions (e.g., lower signal strength). The BS 104 may then schedule control information in the frames and transmit these frames to user terminals of a particular group based on the channel conditions as described above.

Figure 7:
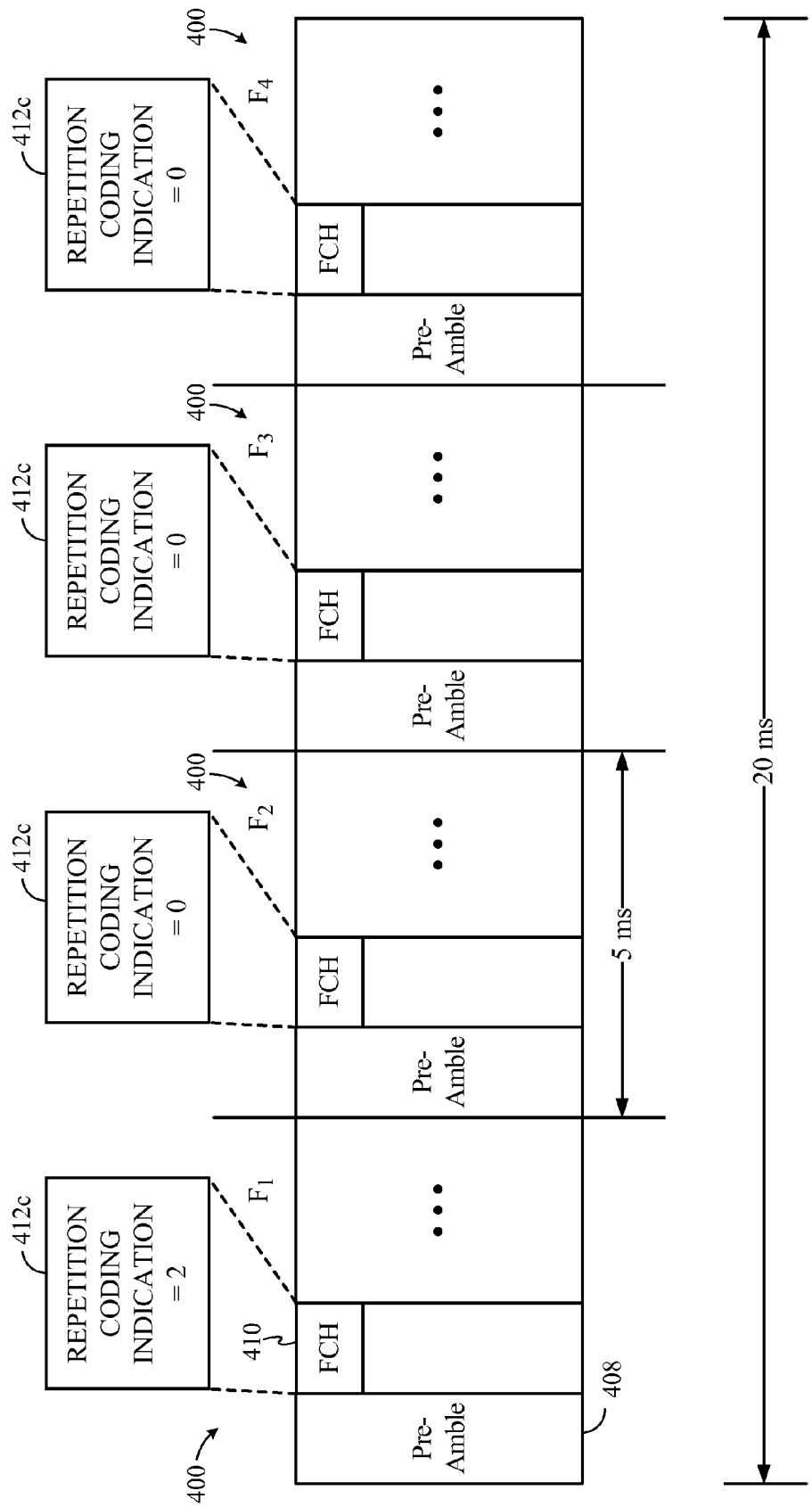
FIG. 7 illustrates an example frame allocation for reducing overhead due to control information, in accordance with certain embodiments of the present disclosure.

For certain embodiments of the present disclosure, scheduling frames for transmission may be performed in such a manner that frames intended for user terminals with more desirable channel conditions may be transmitted more frequently. An advantage of this approach is that average overhead transmitted to the user terminals may decrease even further, resulting in even higher system throughput. FIG. 7 illustrates such an example in which information for user terminals with less desirable channel conditions may be scheduled in one out of every four OFDM/OFDMA frames 400, while information for user terminals with more desirable channel conditions may be scheduled in the remaining three frames.

Accordingly, control information for user terminals such as those in group G2 of FIG. 6 may be scheduled in frame F1, for example, while information for user terminals such as those in group G1 may be scheduled in frames F2, F3, and F4. Control information for user terminals with less desirable channel conditions need not be scheduled in the first frame and can be scheduled in any one of the four frames. Furthermore, the control information for user terminals with less desirable channel conditions may be transmitted as one out of more or less than four frames.

As described above, the repetition factor corresponding to a particular frame may be indicated in the repetition coding indication 412c of the frame. As illustrated in FIG. 7, repetition coding indication 412c of the frame F1 contains a two-bit value of 2, which indicates a total DL-MAP repetition of 4 (i.e., three repeats of one original DL-MAP), according to FIG. 4B. On the other hand, frames F2, F3, and F4 contain no repeats of the DL-MAP (a total DL-MAP repetition of 1) as indicated by the repetition coding indication 412c of these frames, which contain a two-bit value of 0. Thus, by selecting suitable repetition factors and/or modulation/coding schemes for control information transmitted to user terminals, overhead transmitted to the user terminals may be reduced, thereby improving system throughput.

Another advantage of the overhead reduction techniques of the present disclosure is that these techniques may be suitable for use in wireless communication systems employing a low frequency reuse factor (e.g., 1, rather than a reuse factor of 3). Systems employing such a low frequency reuse factor may allow for more efficient utilization of system bandwidth. As an example, with a frequency factor of 1, a BS scheduler that schedules data bursts in a frame is not restricted to certain segments in the frame, which may result in increased utilization of the frame.

However, in such systems, user terminals are more prone to receive signals from a neighbor BS in addition to receiving signals from a serving BS. This co-channel interference (CCI) is even more likely to affect user terminals at the edge of the serving BS's coverage area. According to certain embodiments of the present disclosure, frames transmitted to user terminals at the edge of coverage may utilize high-repetition and/or an MCS with a lower data rate for control information as described above. As a result, reception at these user terminals may improve and effects of the CCI may be reduced, thereby enabling use of a frequency reuse factor of 1.

Figure 5A:
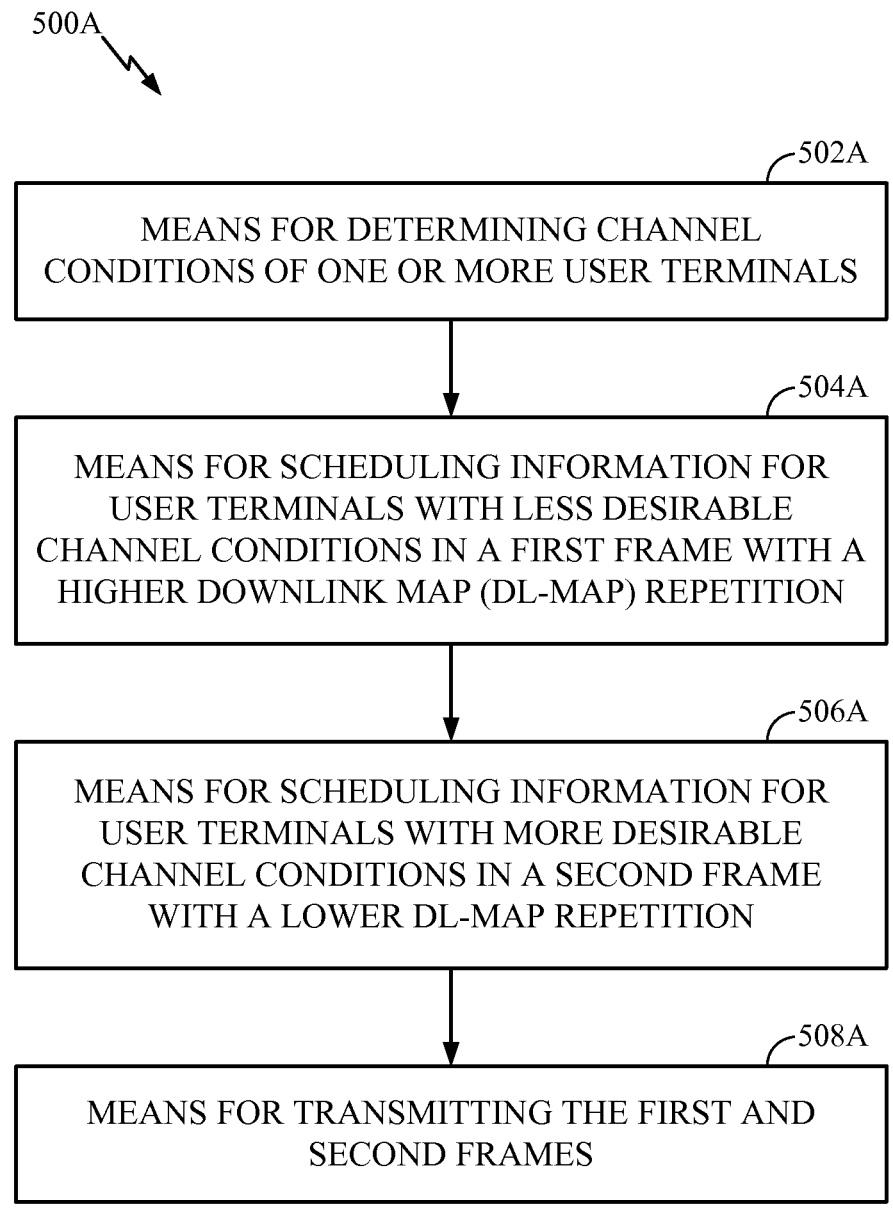
FIG. 5A is a block diagram of means corresponding to the example operations of FIG. 5, in accordance with certain embodiments of the present disclosure.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 502 through 508 illustrated in FIG. 5 correspond to means-plus-function blocks 502A through 508A illustrated in FIG. 5A.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Information and signals may be represented using any of a variety of different technologies and techniques. For example, data, instructions, commands, information, signals, and the like that may be referenced throughout the above description may be represented by voltages, currents, electromagnetic waves, magnetic fields or particles, optical fields or particles, or any combination thereof.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by one or more processors, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
   determining channel conditions of a plurality of user terminals;
   grouping a first set of the user terminals with channel conditions below a threshold into a first group;
   grouping a second set of the user terminals with channel conditions above the threshold into a second group;
   scheduling information for the first set of the user terminals with channel conditions below the threshold in a first frame with a first downlink MAP (DL-MAP) repetition;
   scheduling information for the second set of the user terminals with channel conditions above the threshold in a second frame with a second DL-MAP repetition, the second DL-MAP repetition being lower than the first DL-MAP repetition; and
   transmitting the first and second frames.

2. The method of claim 1, further comprising:
   using a first modulation and coding scheme with a first data rate for the information in the first frame; and
   using a second modulation and coding scheme with a second data rate for the information in the second frame, the second data rate being higher than the first data rate.

3. The method of claim 2, wherein the first modulation and coding scheme comprises quadrature phase-shift keying (QPSK) with a coding rate of ½.

4. The method of claim 2, wherein scheduling the information in the second frame comprises using a frequency reuse factor of 1.

5. The method of claim 1, wherein the second DL-MAP repetition is four total repetitions (a repetition coding indication of 2) and the first DL-MAP repetition is one total repetition (a repetition coding indication of 0).

6. The method of claim 1, wherein the channel conditions below the threshold have lower signal-to-interference-plus-noise ratios (SINRs) than the channel conditions above the threshold.

7. The method of claim 1, further comprising:

scheduling information for a third set of the user terminals with channel conditions above the threshold in a third frame with the second DL-MAP repetition; and scheduling information for a fourth set of the user terminals with channel conditions above the threshold in a fourth frame with the second DL-MAP repetition, such that one frame out of every four frames is allocated for the user terminals with channel conditions below the threshold.

8. An apparatus for wireless communications, comprising:
means for determining channel conditions of one or more user terminals;
means for grouping a first set of the user terminals with channel conditions below a threshold into a first group;
means for grouping a second set of the user terminals with channel conditions above the threshold into a second group;
means for scheduling information for the first set of the user terminals with channel conditions below the threshold in a first frame with a first downlink MAP (DL-MAP) repetition;
means for scheduling information for the second set of the user terminals with channel conditions above the threshold in a second frame with a second DL-MAP repetition, the second DL-MAP repetition being lower than the first DL-MAP repetition; and
means for transmitting the first and second frames.

9. The apparatus of claim 8, further comprising:
means for using a first modulation and coding scheme with a first data rate for the information in the first frame; and
means for using a second modulation and coding scheme with a second data rate for the information in the second frame, the second data rate being higher than the first data rate.

10. The apparatus of claim 9, wherein the first modulation and coding scheme comprises quadrature phase-shift keying (QPSK) with a coding rate of ½.

11. The apparatus of claim 9, wherein the means for scheduling the information in the second frame is configured to use a frequency reuse factor of 1.

12. The apparatus of claim 8, wherein the second DL-MAP repetition is four total repetitions (a repetition coding indication of 2) and the first DL-MAP repetition is one total repetition (a repetition coding indication of 0).

13. The apparatus of claim 8, wherein the channel conditions below the threshold have lower signal-to-interference-plus-noise ratios (SINRs) than the channel conditions above the threshold.

14. The apparatus of claim 8, further comprising:
means for scheduling information for a third set of the user terminals with channel conditions above the threshold in a third frame with the second DL-MAP repetition; and
means for scheduling information for a fourth set of the user terminals with channel conditions above the threshold in a fourth frame with the second DL-MAP repetition, such that one frame out of every four frames is allocated for the user terminals with channel conditions below the threshold.

15. An apparatus for wireless communications, comprising:
logic for determining channel conditions of one or more user terminals;
logic for grouping a first set of the user terminals with channel conditions below a threshold into a first group;
logic for grouping a second set of the user terminals with channel conditions above the threshold into a second group;
logic for scheduling information for the first set of the user terminals with channel conditions below the threshold in a first frame with a first downlink MAP (DL-MAP) repetition
logic for scheduling information for the second set of the user terminals with channel conditions above the threshold in a second frame with a second DL-MAP repetition, the second DL-MAP repetition being lower than the first DL-MAP repetition; and
a transmitter for transmitting the first and second frames.

16. The apparatus of claim 15, further comprising:
logic for using a first modulation and coding scheme with a first data rate for the information in the first frame; and
logic for using a second modulation and coding scheme with a second data rate for the information in the second frame, the second data rate being higher than the first data rate.

17. The apparatus of claim 16, wherein the first modulation and coding scheme comprises quadrature phase-shift keying (QPSK) with a coding rate of ½.

18. The apparatus of claim 16, wherein the logic for scheduling the information in the second frame is configured to use a frequency reuse factor of 1.

19. The apparatus of claim 15, wherein the second DL-MAP repetition is four total repetitions (a repetition coding indication of 2) and the first DL-MAP repetition is one total repetition (a repetition coding indication of 0).

20. The apparatus of claim 15, wherein the channel conditions below the threshold have lower signal-to-interference-plus-noise ratios (SINRs) than the channel conditions above the threshold.

21. The apparatus of claim 15, further comprising:
logic for scheduling information for a third set portion of the user terminals with channel conditions above the threshold in a third frame with the second DL-MAP repetition; and
logic for scheduling information for a fourth set of the user terminals with channel conditions above the threshold in a fourth frame with the second DL-MAP repetition, such that one frame out of every four frames is allocated for the user terminals with channel conditions below the threshold.

22. A computer-program product for wireless communications, the computer-program product comprising a non-transitory computer-readable storage medium having instructions stored thereon, the instructions being executable by one or more processors and the instructions comprising:
instructions for determining channel conditions of one or more user terminals;
instructions for grouping a first set of the user terminals with channel conditions below a threshold into a first group;
instructions for grouping a second set of the user terminals with channel conditions above the threshold into a second group;
instructions for scheduling information for the first set of the user terminals with channel conditions below the threshold in a first frame with a first downlink MAP (DL-MAP) repetition;
instructions for scheduling information for the second set of the user terminals with channel conditions above the threshold in a second frame with a second DL-MAP repetition, the second DL-MAP repetition being lower than the first DL-MAP repetition; and
instructions for transmitting the first and second frames.

23. The computer-program product of claim 22, further comprising:

instructions for using a first modulation and coding scheme with a first data rate for the information in the first frame; and instructions for using a second modulation and coding scheme with a second data rate for the information in the second frame, the second data rate being higher than the first data rate.

24. The computer-program product of claim 23, wherein the first modulation and coding scheme comprises quadrature phase-shift keying (QPSK) with a coding rate of ½.

25. The computer-program product of claim 23, wherein the instructions for scheduling the information in the second frame comprise instructions for using a frequency reuse factor of 1.

26. The computer-program product of claim 22, wherein the second DL-MAP repetition is four total repetitions (a repetition coding indication of 2) and the first DL-MAP repetition is one total repetition (a repetition coding indication of 0).

27. The computer-program product of claim 22, wherein the channel conditions below the threshold have lower signal-to-interference-plus-noise ratios (SINRs) than the channel conditions above the threshold.

28. The computer-program product of claim 22, further comprising:

instructions for scheduling information for a third set of the user terminals with channel conditions above the threshold in a third frame with the second DL-MAP repetition; and instructions for scheduling information for a fourth set of the user terminals with channel conditions above the threshold in a fourth frame with the second DL-MAP repetition, such that one frame out of every four frames is allocated for the user terminals with channel conditions below the threshold.

* * * * *